July 17, 1951 L. A. MAYBERRY 2,561,128

SUPERREGENERATIVE RADIO APPARATUS

Filed Oct. 22, 1947 2 Sheets-Sheet 1

Inventor:
Leonard A. Mayberry,
By Chritton, Schroeder, Merriam & Hofgren,
Attys.

SUPERREGENERATIVE RADIO APPARATUS

Filed Oct. 22, 1947 2 Sheets-Sheet 2

Inventor:
Leonard A. Mayberry
By Chritton, Schroeder, Merriam & Hofgren,
Attys.

Patented July 17, 1951

2,561,128

UNITED STATES PATENT OFFICE 2,561,128

SUPERREGENERATIVE RADIO APPARATUS

Leonard A. Mayberry, Wheaton, Ill., assignor to The Hallicrafters Co., a corporation of Illinois Application October 22, 1947, Serial No. 781,338

3 Claims. (Cl. 250—20)

This invention relates to radio apparatus, and more particularly to radio apparatus operating on the superregenerative principle.

While the basic principles of superregeneration have been known for many years, and while its possibilities of tremendous amplification in a single stage and almost perfect automatic volume control or limiting action have been appreciated, in the past superregenerative circuits have been used to only a very limited extent because of disadvantages which were formerly believed to be inherent in such circuits. The principal disadvantages have been extremely poor selectivity, radiation or transmission of severe interference, and interruption or quench frequency components of large magnitude in the output.

Because of the failure in the past to overcome these disadvantages, superregenerative circuits have been used only in very special applications where selectivity and interference radiation were not important factors. For example, superregenerative circuits have found their widest use as detectors of amplitude modulated signals in the very high frequency range above about 60 megacycles. In this type of service, if the interruption or quench frequency is above the audible range—i. e., above about 15 kc.—it can be filtered out by a suitable low pass filter between the superregenerative detector and the audio system of the radio receiver. Interference radiation and poor selectivity have not been considered objectionable in these applications because of the limited activity at frequencies above 60 megacycles. However, in all cases where the activity in a certain band of frequencies has increased, as in the case of the emergency services in the frequency band around 30 megacycles, the superregenerative receiver has been abandoned in favor of some more conventional type of receiver, as for example the superheterodyne receiver, with its high order of selectivity and freedom from radiation of interference, and receivers embodying superregenerative circuits have never found practical use in the standard broadcast or frequency modulation bands.

Superregenerative circuits have heretofore been designed on the theory that for a given operating frequency only one quench frequency provides maximum sensitivity and optimum performance. Furthermore, it has been considered undesirable to provide one or more stages of amplification between the antenna and the superregenerative circuit since the addition of such stage or stages resulted in so much noise, believed to be from plate current flow in the amplifier stage, that no additional usable gain resulted.

Also, until now the best known method of utilizing a superregenerative stage in a frequency modulation receiver has been to employ the "slope tuned" method of demodulating the FM signal. This is done by adjusting the frequency of the superregenerative stage so that the received signal falls near the center of the most linear portion of one side of the selectivity curve of the superregenerative stage. This method converts a frequency modulated signal to an amplitude modulated signal which in turn may be converted to an audio voltage in conventional manner. This "slope tuned" method of detection has certain disadvantages, however, and has been superseded in most conventional frequency modulation receivers by a balanced type frequency discriminator, as for example a Foster-Seeley discriminator; but it has heretofore been considered impractical to use such a discriminator in conjunction with a superregenerative stage.

Also, superregenerative circuits have not found use in practical frequency modulation receivers partly because with conventionally designed superregenerative circuits the operating frequency of the superregenerative stage must be approximately one thousand times the frequency deviation of the frequency modulated signal in order to make possible a quench frequency that is higher than the maximum frequency deviation of the received signal. For example, if the frequency deviation of the received signal were plus or minus 50 kc., the required operating frequncy of the superregenerative stage would be about 50 megacycles. Obviously, a 50 megacycle stage would have extremely poor selectivity, and the superregenerative frequency modulation receivers heretofore proposed provided insufficient selectivity to separate the frequency modulation stations in a given locality.

I have devised and am herewith disclosing and claiming radio apparatus including a superregenerative circuit wherein all of the above disadvantages are overcome, and full advantage is taken of the desirable characteristics of the superregenerative circuit to provide a radio receiver which adequately fulfills the high performance requirements of the modern radio art.

Among these requirements is the necessity for high sensitivity. The maximum of sensitivity for a radio receiver is defined as the amplitude in volts or microvolts of the lowest level signal that can be heard intelligibly above the thermal agitation noise level. The thermal agitation noise level in a well designed antenna and input circuit can readily be made less than one microvolt, and the voltage amplification required to render a one microvolt signal audible is of the order of one million, or 120 decibels.

The selectivity of a high class receiver should at least be good enough to permit separation of two adjacent channel signals of equal magnitude at the receiving antenna, and the receiver should not radiate any signal which is strong enough to interfere with any other signal which is being either transmitted or received.

In an amplitude modulation receiver, the automatic volume control action should be good enough to prevent objectionable differences in audio power output as the receiver is tuned from a very strong signal to a relatively weak signal. Analogous to this automatic volume control action is the limiting action in a frequency modulation receiver, such limiting action being defined as that property of a circuit which provides an output voltage of constant amplitude regardless of the variations in amplitude of the input voltage. It is this particular function of a frequency modulation receiver which accounts in large part for the noise-free reception. The desired signal is modulated by changes in frequency rather than by changes in amplitude, and the limiting action affects only the voltage amplitude of the signal and therefore does not alter the desired modulation. Since static and noise disturbances are principally in the form of voltages which vary in amplitude and do not cause difficulties in the receiver because of frequency variations, the limiting action removes most of these static and noise disturbances. For this reason the ideal detector for frequency modulated signals provides no output for changes in amplitude, but provides an output which is solely a function of changes of frequency.

The superregenerative circuit disclosed herewith meets all the above mentioned requirements for good performance in a radio receiver. As far as high sensitivity is concerned, voltage gains between 100,000 and 1,000,000 are readily obtainable in one superregenerative stage as disclosed herewith, whereas at least three or four conventional amplifier stages would be required to obtain this same gain. The automatic volume control and limiting action of my improved superregenerative circuit is better than it is possible to obtain using conventional AVC or limiting circuits of two or more stages. As further features of my invention, I have provided a superregenerative stage which when used with associated circuits is far more selective than has heretofore been possible, which does not radiate undesirable signals, and which may be utilized with a balanced type frequency discriminator or detector in a frequency modulation receiver.

Other features and advantages of my invention will be apparent from the following specification and from the drawings, in which.

Figures 1, 2:
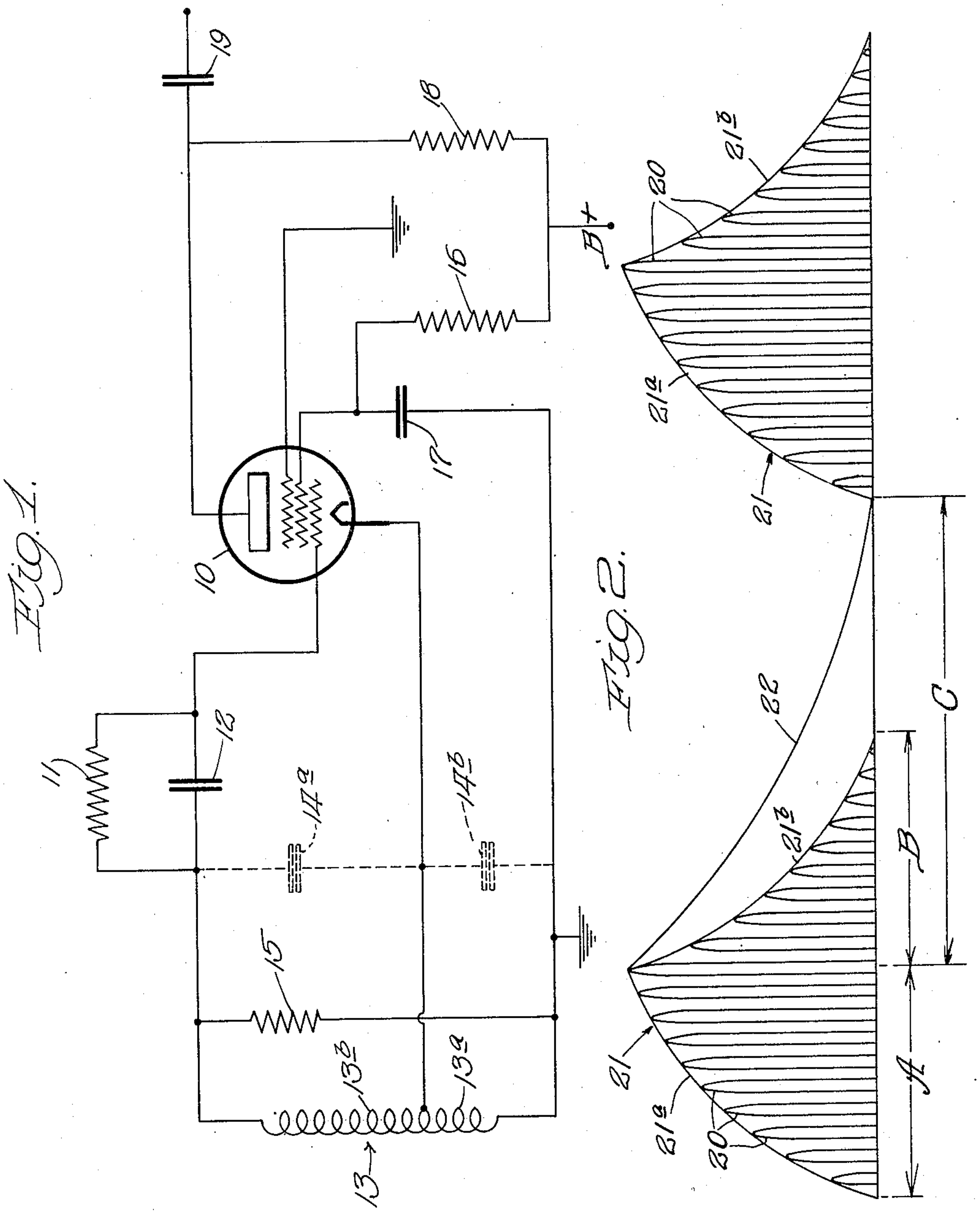
Fig. 1 is a schematic diagram of a basic superregenerative circuit designed and constructed in accordance with my invention.
Fig. 2 is a graph illustrating certain features of the operation of the circuit of Fig. 1.

Referring now to the drawings, Fig. 1 will be used to illustrate the basic operation of my improvements in a superregenerative circuit. In such circuit a tube 10, which may be of tube type No. 6AU6 having cathode, control grid, screen grid, suppressor grid and anode elements, is used as an intermittent oscillator. The control grid of said tube is connected to a tuned input circuit through a resistive-capactive arrangement comprising a resistor 11 (which may have a value of 56,000 ohms) and a condenser 12 (which may have a value of 50 micro-microfarads) the condenser and resistor being connected in parallel between the control grid and said input circuit, and thus back to the cathode, to which the tuned input circuit is connected. The input circuit comprises a parallel combination of an inductance designated generally at 13, and a resistor 15. The inductance may have a value suitable to resonate with the distributed circuit capacitance designated at 14*a* and 14*b* at a desired frequency, as for example 5.25 megacycles, and the resistive circuit component or element 15 which is connected in parallel with the tuned circuit may have a value of 8,000 ohms. This resistor, here shown as connected across the tuned circuit, provides the same damping effect as would a much smaller resistance connected in series in said circuit, reducing the ratio of reactance to resistance, or the "Q" of the circuit.

An output circuit is also associated with the tube 10, this circuit being the screen grid-cathode circuit. Feed-back coupling between the output and input circuits, sufficient to develop oscillation, is provided by means of magnetic coupling between the screen grid-cathode portion 13*a* and the control grid-cathode portion 13*b* of the inductance 13. The degree of magnetic coupling between the two portions of the inductance together with their inductance ratio determines what portion of the oscillatory energy in the output circuit of the tube is coupled back into the input circuit of the tube to provide the desired regenerative action. In one circuit which I have constructed, the inductance 13 comprises 144 turns of #38 S.C.E. wire tapped at 40 turns from the ground end. The screen grid acts as the oscillator anode in the tube 10, and said screen grid is connected to B-plus through a resistor 16 which may have a value of 75,000 ohms and which isolates the B-plus supply from the oscillatory energy in the output circuit, this energy being coupled to the grounded side of the inductance 13 through a condenser 17 which may, for example, have a value of 0.005 microfarad. The cathode of the tube 10 is returned to ground and to the negative side of the B-plus supply through the lower portion 13*a* of the inductance 13, and the anode of the tube 10 is connected to B-plus through a resistor 18, which may have a value of 68,000 ohms. A coupling condenser 19, which may have a value of 50 micro-microfarads, is in a lead from the plate of the tube to an output terminal.

In a circuit of this type each oscillation cycle must be started by some voltage having a frequency component within the regenerative pass band of the tuned input circuit, and if no such voltage were present the tube 10 would never start to oscillate; however, such a voltage is always found in a circuit of this type since there are always minute random fluctuations of electrons known as thermal agitation or noise voltage, some frequency component of which always lies within the regenerative band of the tuned input circuit. The amplitude of these thermal voltages is of the order of one microvolt in most practical tuned circuits.

The oscillations, once started as these thermal voltages are coupled into the input circuit, rapidly build up to a maximum value due to the regenerative or feed-back action of the circuit. The amplitude of this maxium value depends on the relationship between the negative bias voltage developed at the grid of the tube by rectification of grid-cathode current, the mutual conductance of the tube, plate and screen resistance, and D. C. voltages.

The maximum amplitude of these oscillations may be of the order of one volt or more in a low power oscillator. In this event the ratio of the maximum voltage to a starting or actuating voltage of the order of one microvolt, whether a thermal or signal voltage, is approximately one million to one, thus providing an extremely high amplification factor for a single stage. A portion of the output is constantly being fed back into the input circuit because of the coupling between the two portions 13*a* and 13*b* of the inductance 13, and this regenerative action would normally cause the tube 10 to continue oscillating. However, it is possible to provide such values for the resistor 11 and the condenser 12 that the negative grid bias voltage developed by the grid-cathode rectification in the tube charges the condenser 12 to a value high enough to cut off the flow of plate current through the tube. If the time constant of the resistor 11 and the condenser 12 is sufficiently long to hold the tube below cutoff for the duration of the next cycle of oscillatory voltage across the tuned input circuit, the oscillations will gradually decay at a rate determined by the ratio of reactance to resistance in said input circuit. When the condenser 12 has discharged through the resistor 11 to a degree where its voltage is such that the tube 10 is no longer cut off, plate current will again flow through the tube and minute voltage fluctuations will again be coupled into the input circuit to start a new cycle of oscillations. The rate at which these oscillatory cycles occur is known as the "quench" frequency, and the principle of applying a quench frequency to a regenerative oscillator is known as superregeneration. Obviously, other ways of providing a quench frequency may be utilized if desired, as for example by utilizing a separate oscillator which applies a voltage to the tube 10 sufficient to cut off said tube intermittently at a predetermined rate.

If, instead of allowing thermal noise voltages to trigger the tube to initiate each cycle, we introduce a signal voltage of slightly greater amplitude than the thermal noise level, this signal voltage will start each cycle. If the signal is amplitude modulated, the signal voltage amplitude will be varied in accordance with the modulation, and thus the starting point of each buildup-decay cycle will be varied in time in accordance with the modulation, being advanced or retarded in accordance with variations in the modulating voltage. This action results in changes in quench frequency with consequent changes in average anode current drawn by the tube 10, and the desired audio signal is present in the form of variations in tube anode current.

If the signal is frequency modulated, however, the start of each cycle is triggered at very nearly the same time since the triggering or signaling voltage pulses are of substantially constant amplitude. However, since the triggering signal changes in phase in accordance with the frequency modulation, the high frequency oscillations developed by the superregenerative circuit during each quench cycle differ in phase from the preceding cycle by the exact amount the triggering signal has changed in phase. Obviously, the triggering signal may have an amplitude only slightly above the thermal or noise level, while the output signal reproduces the same phase excursions as the triggering signal and has an output equal to the maximum amplitude determined by the tube constants above referred to, resulting in very great amplification. Since the oscillations are allowed to reach a maximum during each cycle the output voltage amplitude remains constant independent of the amplitude of the triggering voltage, giving the superregenerative circuit almost perfect limiting action.

In designing a superregenerative circuit which will fulfill the desired requirements listed above, it is first necessary to provide a means for increasing the quench frequency far beyond its conventionally accepted relationship with respect to the operating frequency of the superregenerative circuit. For frequency modulation reception, the quench frequency must be at least two to three times higher than the frequency deviations of the incoming signal in order to avoid overlapping of adjacent side bands in the demodulator circuit and consequent distortion, and to realize the desired selectivity the operating frequency of the superregenerative circuit must be relatively low. For example, if an FM signal has been heterodyned to a frequency of 5.25 megacycles at the input to the superregenerative circuit, and if said signal has a frequency deviation of plus or minus 15 kc. and is spaced 60 kc. from the nearest FM signal generated by another station, in order to receive one signal clearly and without undue interference from the other signal, the quench frequency would have to be of the order of 50 kc. or about eight times higher than the previously accepted top limit for a 5.25 megacycle superregenerative stage. Under the conditions assumed, the required selectivity may be realized readily with a single properly designed 5.25 megacycle amplifier stage preceding the superregenerative stage. However if, as has been required in the past, the superregenerative operating frequency is moved up to a value high enough to permit a normal 50 kc. quench frequency (which means an operating frequency of about 50 megacycles), it is no longer practical to realize the selectivity required for separating two signals spaced 60 kc. apart.

I have found that while using a conventionally designed input circuit, normally of relatively high Q, tuned to operate in the desired range (no higher than 5.25 megacycles) 15 kc. is about the highest quench frequency possible for good lock-in sensitivity. With such a circuit the ratio of the length of each buildup-decay cycle to the time between such cycles is about 1 to 16. If the quench frequency is raised to 50 kc., this ratio is about 1 to 6 and the result is that the circuit oscillates continuously. I have discovered that this continued oscillation is caused by the long oscillatory decay time of the tuned input circuit, the oscillations in such circuit failing to decay to a level lower than the thermal noise level before the start of the next buildup-decay cycle. In this specification and the claims attached hereto, it will be understood that "decay time" means the length of time required for the amplitude of the high frequency oscillations to be reduced from the maximum value to a value at or below the thermal agitation noise level.

Fig. 2 shows the action of the superregenerative circuit in Fig. 1, when said circuit is designed in accordance with my invention, the axis of ordinates in said figure representing voltage amplitude and the axis of abscissas in said figure representing time. In Fig. 2 the high frequency oscillations (5.25 megacycles in the example given) of the circuit are schematically illustrated at 20, while the buildup-decay cycles of the circuit are designated generally at 21. The rising portion 21a of each of these cycles represents the buildup of the oscillations to a maximum value, and the decaying portion 21b of said cycles represents the oscillatory decay time of the input circuit. The decay curve of the resistive-capacitive grid leak circuit 11—12 is designated at 22.

From this figure it will be seen that in my improved superregenerative circuit the oscillatory buildup time A is approximately equal to the oscillatory decay time B of the tuned input circuit, and the decay time C of the RC grid leak network is in the order of twice the time B. Explaining the graph in another way, the circuit builds up to maximum output in the time A and decays to minimum output in the time B, A and B being substantially equal to each other. The bias voltage on the grid of the tube 10 reaches a value sufficient to cut the tube off at the peak of the cycle 21, and said bias voltage gradually decays during the time C to a point where the tube is allowed to conduct again. The decay for the tuned input circuit follows the formula $$\frac{E_2}{E_1}=\frac{1}{\epsilon^{at}}$$

where $E_1$ and $E_2$ are respectively the initial and final voltages, $\epsilon$ is the base of the system of natural logarithms (a constant equal to 2.718+), $a$ equals $$\frac{R}{2L}$$

(R being equal to the equivalent series resistance of the circuit in ohms, and L being equal to the inductance of the circuit in henrys), and $t$ equals the elapsed time in seconds. Since $$Q=\frac{\omega L}{R}$$

(Q being equal to the ratio of reactance to resistance and $\omega$ being equal to $2\pi$ times the frequency in cycles per second), the formula may be expressed as $$\frac{E_2}{E_1}=\frac{1}{\epsilon^{\frac{\omega t}{2Q}}}$$

If the total time is equal to one cycle of the radio frequency voltage, $\omega t$ may be replaced by $2\pi$, which simplifies the expression to $$\frac{E_2}{E_1}=\frac{1}{\epsilon^{\frac{\pi}{Q}}}$$

Substituting $a_1$ for $$\frac{E_2}{E_1}$$

and rearranging, $$Q=\frac{-1.36}{\log_{10} a_1}$$

If $a_1$ is expressed in decibels, then $$\log a_1=\frac{-d}{20}$$

and the formula for Q becomes $$Q=\frac{27}{\alpha}$$

where $\alpha$ is equal to the attenuation per cycle in decibels.

By examination of this formula for Q, it may be seen that higher values of Q lead to smaller values of attenuation per cycle.

From the above it will be seen that in a superregenerative circuit designed to have the operating characteristics as shown in Fig. 2, the input circuit associated with the control grid of the superregenerative tube must have an abnormally low ratio of reactance to resistance (Q) and consequently a short oscillatory decay time. In such circuit the time for oscillations to build up to a peak (time A in Fig. 2) plus the time it takes for oscillations in the input circuit to decay to a level below the thermal or noise voltage (time B in Fig. 2) should be as short as possible compared to the peak amplitude of the oscillatory voltage, and the time it takes the quench or grid bias voltage to decay to a point where the tube may again conduct (time C in Fig. 2) should be at least as long as the decay time of the input circuit. I prefer that time C be of the order of twice time B in order to assure complete cessation of oscillations while tube 10 is cut off.

The desired abnormally low Q of the tuned input circuit may be mathematically calculated to correspond to this requirement by making use of the formula derived above.

For example, if the operating frequency is 5.25 megacycles and the desired quench frequency is 100 kc., the peak amplitude equals 1 volt, and the thermal levvel or noise voltage is assumed to be 1 microvolt, the ratio of oscillatory cycles to quench cycles is 52.5 to 1. Expressed in terms of the graph in Fig. 2, time A plus time C equals 52.5 oscillatory cycles, and the oscillatory voltage must decay from its maximum of 1 volt to 1 microvolt, a total attenuation of 120 db., in time B or in approximately 17 oscillatory cycles. Consequently, the rate of attenuation in the input circuit must be approximately 7 db. per cycle. Applying the formula for Q noted above, Q equals $$\frac{27}{7}$$

or approximately 4, which is abnormally low for such a circuit.

The choice of values for the resistor 11 and the condenser 12 to provide an operating curve substantially as shown in Fig. 2 may also be mathematically determined since the decay of an RC circuit follows the curve expressed by the formula $$\frac{1}{\epsilon^{\frac{RC}{t}}}$$

Since $t$ is known, it being a function of the desired quench frequency, and since the maximum grid bias at the time the tube is quenched is known and since the grid bias value when the tube again is ready to conduct is also known, the total RC value can be determined. By arbitrarily picking an appropriate value for either the condenser or the resistor, the value of the unknown element may be readily determined. The calculations above result in a superregenerative circuit constructed as shown schematically in Fig. 1 and having operating characteristics as shown diagrammatically in Fig. 2, wherein a 5.25 megacycle operating frequency and a 100 kc. quench frequency are used, representing an increase of about 16 times the theoretical top limit for the quench frequency according to formerly known design principles.

Figure 3:
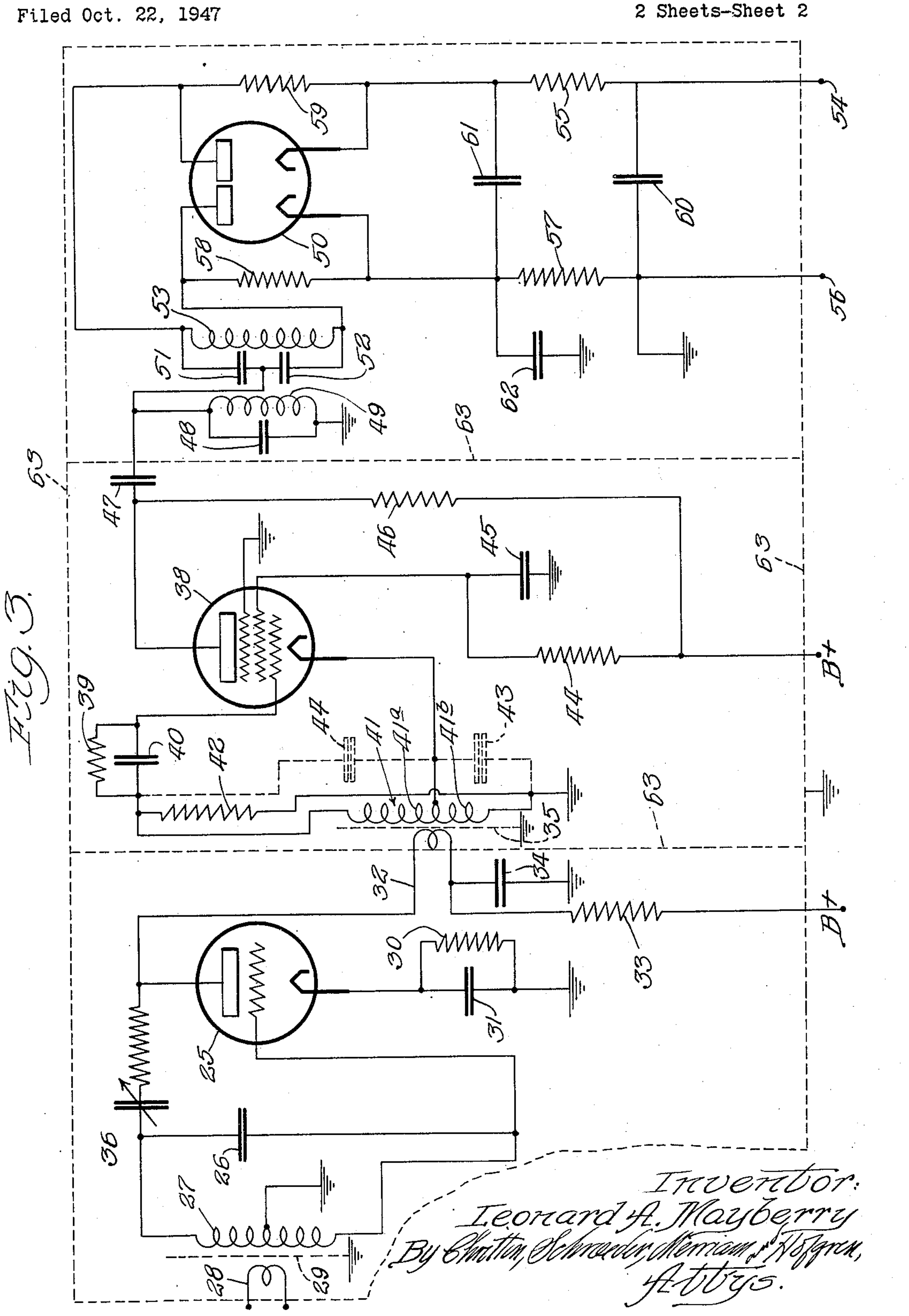
Fig. 3 is a schematic diagram of an operable arrangement including a superregenerative circuit constructed in accordance with my invention and adapted to be utilized as an intermediate frequency amplifier and limiter in a frequency modulation receiver.

Fig. 3 shows a superregenerative circuit constructed in accordance with my invention and utilized as an intermediate frequency amplifier and limiter in a frequency modulation receiver. The superregenerative circuit of Fig. 3 receives its input from a tuned amplifier, and the output of the superregenerative circuit is coupled into a balanced type frequency discriminator. In the past it has been believed not feasible to associate such an amplifier or discriminator with a superregenerative circuit. As pointed out earlier in the specification, the relatively poor selectivity of a superregenerative circuit is overcome in part according to my invention by so designing the circuit that a relatively low operating frequency may be utilized, as for example 5.25 megacycles. The disadvantage of poor selectivity is further overcome by preceding the superregenerative stage with a tuned amplifier circuit.

In Fig. 3 such a tuned circuit is shown comprising a tube 25, which may be of tube type No. 6J6, and which has cathode, grid and anode elements. The grid of said tube is connected to a tuned input circuit comprising the parallel combination of a condenser 26, which may have a value of 50 micro-microfarads, and an inductance 27 which is of such value that the tuned circuit is resonant at the predetermined operating frequency, as for example 5.25 megacycles. The electrical center of the inductance 27 is grounded; and this inductance is magnetically coupled to another or primary inductance 28 which may comprise the output circuit of a conventional heterodying stage utilized to convert the incoming signal to a frequency of 5.25 megacycles in conventional manner. An electrostatic shield 29 is provided in known manner.

The cathode of the amplifier tube 25 is connected to ground through a biasing resistor 30, which may have a value of 470 ohms, high frequency voltages being by-passed around said resistor by means of a condenser 31, which may have a value of 0.005 microfarad. The anode of the tube 25 includes an anode impedance which is illustrated as an inductance 32, and may be in the form of a one turn link wound over the grounded end of the superregenerative input coil, and the anode is supplied with B-plus voltage from any conventional B-plus source preferably of approximately 250 volts through an isolating resistor 33, which may have a value of 47,000 ohms. The signal voltage in the anode circuit is by-passed around the B-plus supply by means of a condenser 34, which may have a value of 0.005 microfarad.

In direct contrast to previously accepted theory, an additional gain is obtained in the receiver illustrated by using an amplifier stage preceding the superregenerative stage, and I am able to obtain an additional gain of about 20 db. by utilizing such an amplifier stage. I have found that the reason that gains have not heretofore been possible where an amplifier stage precedes a superregenerative stage has not been because of shot effect noise induced in the superregenerative circuit by the flow of plate current in the amplifier stage as has been believed in the past, but rather has been because of the noise energy being generated in the superregenerative stage, a large part of this noise energy having been allowed to reach the input circuit of the amplifier where it was amplified and reintroduced to the superregenerative stage, thereby rendering ineffective any gain of the amplifier.

By proper electrostatic isolation and neutralization of the amplifier, I am able to prevent feedback from the superregenerative tube and its associated circuits from being amplified in the amplifier tube 25. This neutralization may be accomplished by feeding back to the input circuit of the amplifier a voltage which is 180 degrees out of phase with the normal input signal. As shown in Fig. 3 this voltage is taken from the anode of the tube 25 through a neutralizing condenser 36, which may have a value of about 2 micro-microfarads and which is preferably variable. Another advantage obtained by means of this neutralization results from the fact that the coupling between the circuits is all one way, that is, there is substantially no coupling from the superregenerative circuit back through the amplifier circuit. If this were not true, then during the time when the superregenerative oscillations were at a maximum level, energy would be fed back to the amplifier circuits. Then when the superregenerative oscillations should normally decay rapidly, they would be sustained and reinforced by this energy being fed back to the superregenerative circuits from the amplifier circuits. This is true because the amplifier circuits (especially the input circuit) would normally have a Q much higher than the abnormally low Q of the superregenerative input circuit in order to achieve selectivity, and consequently the amplifier circuits would have a much longer decay time.

The superregenerative stage is coupled to the above described amplifier stage by means of magnetic coupling between the amplifier plate coil and the superregenerative grid coil. An electrostatic shield 35 is placed between these two coils to prevent stray electrostatic coupling.

The superregenerative stage is basically similar to the circuit illustrated in Fig. 1, and comprises a tube 38 which may be of tube type No. 6AU6 and which has cathode, control grid, screen grid, suppressor grid, and anode elements. The control grid of the tube is connected to the tuned superregenerative input circuit through a grid leak network comprising a resistor 39, which may have a value of 56,000 ohms and a condenser 40 which is connected in parallel with said resistor and which may have a value of 50 micro-microfarads.

The input circuit itself comprises a portion 41*a* of an inductance 41, and a parallel resistance 42, which may have a value of 8,000 ohms. It is to be understood, however, that the input circuit comprises a true resonant circuit having resistive, inductive and capacitive components. As pointed out earlier in connection with Fig. 1, the parallel resistance 42 has the same effect as a much smaller series resistive component in the tuned circuit while permitting greater manufacturing tolerances, easier assembly of components and use of resistors of conventional and readily obtainable values. As is well understood in the art, the capacity necessary for the tuned circuit is provided by the grid-cathode and cathode-ground capacities of the tube 38, these effective capacities being represented in Fig. 3 by dotted line connections and symbolic condensers 43 and 44. The tube capacitances being known, the value of the inductance 41 is chosen such that the input circuit is resonant at the desired operating frequency, as 5,25 megacycles; and the value of the resistor 42 is chosen to cause an abnormally low ratio of reactance to resistance in said tuned circuit so that said input circuit has an abnormally low Q of a value determined by the formula derived above, and of the order of 4.

The screen grid-cathode or output circuit associated with the tube 38 is included as that portion of the tuned input circuit connected between the cathode of the tube 38 and the screen grid which is grounded. Coupling between the output and input circuits associated with the tube 38 is obtained by means of magnetic coupling between the two portions 41a and 41b of the inductance 41 which couples a portion of the output of said tube into said input circuit for causing the tube to oscillate in the conventional manner by regeneration. The output circuit is completed by a connection to the B-plus supply through a resistor 44, which may have a value of 75,000 ohms, a condenser 45 serving to isolate the B-plus supply from the oscillatory energy in the output circuit. This condenser may have a value of 0.005 microfarad. The anode of the tube 38 is connected to the B-plus supply through a resistor 46, which may have a value of 68,000 ohms, said anode also being coupled through a condenser 47, which may have a value of 50 micro-microfarads, to a tuned output circuit comprising a condenser 48 and an inductance 49.

As earlier mentioned, the "slope tuned" method of detecting or demodulating an FM signal has been believed to be the only practical means available following a superregenerative stage because of the difficulties encountered in coupling a high Q balanced type demodulator circuit to the output of a superregenerative stage without upsetting the quenching action. I have discovered that a balanced type demodulator, as the Foster-Seeley type discriminator shown in Fig. 3, can be coupled to the output of the superregenerative stage by making the demodulator frequency higher than that of the superregenerative stage so that the demodulator operates from a harmonic of the signal voltage. This results in only a slight loss in energy when a low harmonic (as the second) is used because of the high harmonic content inherent in wave shapes of the type produced by the quenching action; yet any undesired reflection of energy back into the superregenerative stage at its operating frequency, or disturbance of its action in any way, is avoided.

The frequency discriminator illustrated in Fig. 3 comprises a tube 50 which may be a duo-diode of tube type No. 6AL5 having two sets of cathodes and anodes therein, although it will be understood that two single diodes may be utilized if desired. The anodes of the tube 50 are connected to opposite ends of a tuned circuit comprising two condensers 51 and 52 and an inductance 53, the midpoint between the condensers being connected to the high side of the superregenerative tuned output circuit. While the inductive and capacitive values of the input circuit associated with the tube 38 are such that said input circuit is resonant at a predetermined frequency, as for example 5,25 megacycles, the inductive and capacitive values for the discriminator primary and secondary circuits are such that said circuits are resonant at a chosen harmonic, as twice said predetermined frequency, or 10.5 megacycles. The discriminator primary or input circuit is coupled to the superregenerative output circuit through the cathode-anode electron stream of tube 38 and operates on the second harmonic of the signal frequency. One cathode of the discriminator is connected to an audio output terminal 54 through a resistor 55, and the other cathode of the discriminator is connected to a grounded audio output terminal 56 through a resistor 57. Resistors 55 and 57 each may have a value of 100,000 ohms. The plate and cathode of the respective diode sections are each connected to opposite sides of respective resistors 58 and 59, which each may have a value of 2.2 megohms, and the circuit is completed by a condenser 60 connected across the output terminals, condenser 61 connected across the diode cathodes, and a condenser 62 connected from the lower diode cathode to ground. Condensers 60, 61 and 62 may have respective values of 10, 15 and 2 micro-microfarads.

Since the operation of a balanced discriminator of this type is conventional and is well known in the art, it will be described only briefly here. When the received harmonic of the signal in at the resonant frequency of the tuned circuit comprising the condensers 51 and 52 and the inductance 53, the high frequency voltage across said circuit is 90 degrees out of phase with that across the primary or superregenerative output circuit. Since each diode is connected across one-half of the inductance 53 and the inductance 49 in series, the resultant high frequency voltages applied to each diode are equal and the voltages developed across each of the diode load resistors 55 and 57 are equal and of opposite polarity, and consequently cancel each other out. If, however, the signal varies from the resonant frequency, the 90 degree phase relationship no longer exists. The resultant voltages applied to the two diodes are now no longer equal and a D. C. voltage proportional to the difference between the high frequency voltages applied to the two diodes will exist across said load resistors. As the chosen harmonic of the signal frequency varies back and forth across the resonant frequency of the discriminator, an A. C. voltage of the same frequency as the original modulation and proportional to the frequency deviation of said modulation is developed.

While the circuit illustrated in Fig. 3 operates quite satisfactorily without shielding, I have found that better performance is possible when shielding between the three stages is provided. Consequently, I prefer to house my improved circuit in a three compartment shielding housing which is preferably of copper, this housing being grounded and being designated schematically by the dashed lines 63.

The amplification and limiting action of the circuit illustrated in Fig. 3 is equivalent to that obtained in a conventional circuit having a total of seven tubes comprising four 5.25 megacycle amplifier stages, two limiter stages, and a balanced discriminator stage. The relatively simple supperregenerative stage of Fig. 3 alone provides a voltage gain equal to or better than three conventional high gain pentode amplifier stages, and a limiting action superior to that of two conventional limiter stages.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. A superregenerative circuit of the character described, including: an amplifier tube; a tuned input circuit coupled to said tube, said circuit having a ratio of reactance to resistance of substantially four at its resonant frequency and having a short oscillatory decay time; an output circuit coupled to said tube; coupling between said circuits for causing said tube to oscillate at the resonant frequency of said input circuit; and means comprising a resistance-capacitance network coupled to one of said circuits for quenching such oscillations at a predetermined frequency not less than one hundredth of said resonant frequency and having a voltage decay time such as to hold said tube cut off longer than said first mentioned decay time to prevent said tube from oscillating for a period at least as long as said decay time.

2. A superregenerative circuit of the character described, including: an amplifier tube; a tuned input circuit coupled to said tube, said circuit having resistive, inductive and capacitive components so proportioned that at resonance the ratio of the reactance to the resistance is substantially four and said circuit has a short oscillatory decay time; an output circuit coupled to said tube; coupling between said circuits for causing said tube to oscillate at the resonant frequency of said input circuit; and means comprising a resistance-capacitance network coupled to one of said circuits for quenching such oscillations at a predetermined rate of the order of one hundredth of said resonant frequency and having a voltage decay time such as to hold said tube cut off longer than said first mentioned decay time to prevent said tube from oscillating for a period in the order of twice the length of said decay time.

3. A superregenerative circuit of the character described, including: an amplifier tube; a tuned input circuit coupled to said tube, said circuit having a ratio of reactance to resistance of substantially four at its resonant frequency and having a short oscillatory decay time; an output circuit coupled to said tube; coupling between said circuits for causing said tube to oscillate; and means coupled to one of said circuits for quenching such oscillations at a predetermined rate, such means comprising a resistance-capacitance network developing a voltage sufficient to cut off said tube, said network having a time constant longer than said oscillatory decay time and having a voltage decay time such that said tube is held below cutoff for a period longer than said first mentioned decay time.

LEONARD A. MAYBERRY.

REFERENCES CITED

The following references are of record in the file of this patent:

UNITED STATES PATENTS

| Number | Name | Date |
|---|---|---|
| 1,743,148 | Landon | Jan. 14, 1930 |
| 2,195,301 | Grayson | Mar. 26, 1940 |
| 2,273,090 | Crosby | Feb. 17, 1942 |
| 2,337,392 | Hunt | Dec. 21, 1943 |
| 2,351,221 | Mountjoy et al. | June 13, 1944 |
| 2,407,394 | Birr | Sept. 10, 1946 |
| 2,410,768 | Worcester | Nov. 5, 1946 |
| 2,410,981 | Koch | Nov. 12, 1946 |
| 2,412,710 | Bradley | Dec. 17, 1946 |
| 2,415,316 | Wheeler | Feb. 4, 1947 |
| 2,420,248 | Koch | May 6, 1947 |